(12) United States Patent
Wang

(10) Patent No.: US 12,079,150 B2
(45) Date of Patent: Sep. 3, 2024

(54) BUS CONNECTION SYSTEM

(71) Applicant: TOSHIBA MITSUBISHI-ELECTRIC INDUSTRIAL SYSTEMS CORPORATION, Tokyo (JP)

(72) Inventor: Xiangguo Wang, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 109 days.

(21) Appl. No.: 17/999,871

(22) PCT Filed: Mar. 17, 2021

(86) PCT No.: PCT/JP2021/010910
§ 371 (c)(1),
(2) Date: Nov. 25, 2022

(87) PCT Pub. No.: WO2022/195779
PCT Pub. Date: Sep. 22, 2022

(65) Prior Publication Data
US 2023/0259470 A1    Aug. 17, 2023

(51) Int. Cl.
*G06F 13/36* (2006.01)
*H02J 7/00* (2006.01)

(52) U.S. Cl.
CPC ............ *G06F 13/36* (2013.01); *H02J 7/0013* (2013.01); *G06F 2213/40* (2013.01)

(58) Field of Classification Search
None
See application file for complete search history.

(56) References Cited

U.S. PATENT DOCUMENTS

| | | | |
|---|---|---|---|
| 8,278,869 B2 * | 10/2012 | Hori | H01M 10/441 320/112 |
| 8,665,891 B2 | 3/2014 | Katou et al. | |
| 9,231,407 B2 * | 1/2016 | Shim | H02J 3/32 |
| 10,347,952 B2 * | 7/2019 | Choi | G01R 31/3648 |
| 2015/0222117 A1 * | 8/2015 | Im | H02J 1/06 307/52 |
| 2022/0314832 A1 * | 10/2022 | An | B60L 1/00 |
| 2023/0420966 A1 * | 12/2023 | Hu | H02J 7/0013 |

FOREIGN PATENT DOCUMENTS

| | | |
|---|---|---|
| JP | 2013-31324 A | 2/2013 |
| JP | 5454517 B2 | 3/2014 |
| JP | 2019-95834 A | 6/2019 |

OTHER PUBLICATIONS

International Search Report and Written Opinion mailed on Jun. 15, 2021, received for PCT Application PCT/JP2021/010910, filed on Mar. 17, 2021, 9 pages including English Translation.

* cited by examiner

*Primary Examiner* — Elias Mamo
(74) *Attorney, Agent, or Firm* — XSENSUS LLP

(57) ABSTRACT

A bus connection system according to an embodiment of the invention includes a control device that is connected to one end of a first bus and operates as a first node, and a bus connection device that is located between another end of the first bus and a first battery pack operating as a second node and between the other end of the first bus and a second battery pack operating as the second node. The bus connection device includes a first switch located between the first battery pack and the other end of the first bus, a second switch located between the second battery pack and the other end of the first bus, and a contact switching circuit sequentially opening and closing the first switch and the second switch.

4 Claims, 6 Drawing Sheets

BUS CONNECTION SYSTEM

CROSS-REFERENCE TO RELATED APPLICATION

The present application is based on PCT filing PCT/JP2021/010910, filed Mar. 17, 2021, the entire contents of which are incorporated herein by reference.

TECHNICAL FIELD

An embodiment of the invention relates to a bus connection system to identify same node.

BACKGROUND ART

Electric vehicles such as electric cars, plug-in hybrid vehicles, etc., are becoming increasingly popular. Electric vehicles are expected to become even more popular in the future to reduce greenhouse gases. On the other hand, battery packs mounted in electric vehicles have lifespans and are replaced after a certain period, etc.

It is predicted that a large quantity of used battery packs will be produced as electric vehicles become increasingly popular. Therefore, ways in which used battery packs should be utilized are being investigated, distribution systems and the like for recycling battery packs are being prepared, and specific utilization methods are being developed. For example, the utilization of battery packs recovered from electric vehicles in renewable energy power storage equipment is being investigated.

In renewable energy power storage equipment, many used battery packs are used by being connected in series and in parallel. A power storage device that includes series and parallel circuits of battery packs identifies many battery packs, ascertains the state of each battery pack, and appropriately controls the charge and/or discharge according to the state of the battery pack.

In an electric vehicle, the battery pack, the control device that controls the charge and discharge of the battery pack, etc., are connected as nodes to a bus following the CAN protocol and are identified by unique identifiers (Identifiers, IDs) (e.g., see Patent Document 1). All battery packs of the same type are assigned the same ID. When recycling battery packs recovered in large quantities, it is necessary for the device that controls the charging, discharging, and the like to identify battery packs having the same ID.

If the IDs are reprogrammed or the terminating resistance provided for the CAN communication is detached to identify battery packs having the same ID, the work man-hours for recycling would be enormous. Furthermore, the management and operation of battery packs including the replacement becomes complex, etc., and the advantages of recycling are undesirably lessened.

PRIOR ART DOCUMENTS

Patent Literature

[Patent Literature 1]
Japanese Patent Application 5454517

SUMMARY OF INVENTION

Technical Problem

Embodiments are directed to obtain a bus connection system that can identify the same node.

Solution to Problem

A bus connection system according to an embodiment of the invention includes a control device that is connected to one end of a first bus and operates as a first node, and a bus connection device that is located between another end of the first bus and a first battery pack operating as a second node and between the other end of the first bus and a second battery pack operating as the second node. The bus connection device includes a first switch located between the first battery pack and the other end of the first bus, a second switch located between the second battery pack and the other end of the first bus, and a contact switching circuit sequentially opening and closing the first switch and the second switch. The contact switching circuit opens the second switch and generates first identification data indicating that the first switch is closed in a first period in which the first switch is closed, and opens the first switch and generates second identification data indicating that the second switch is closed in a second period in which the second switch is closed. The control device acquires the first identification data in the first period by communicating with a first control circuit of the first battery pack, and acquires the second identification data in the second period by communicating with a second control circuit of the second battery back.

Advantageous Effects of Invention

According to an embodiment, a bus connection system that can identify the same node is realized.

Figure 1:
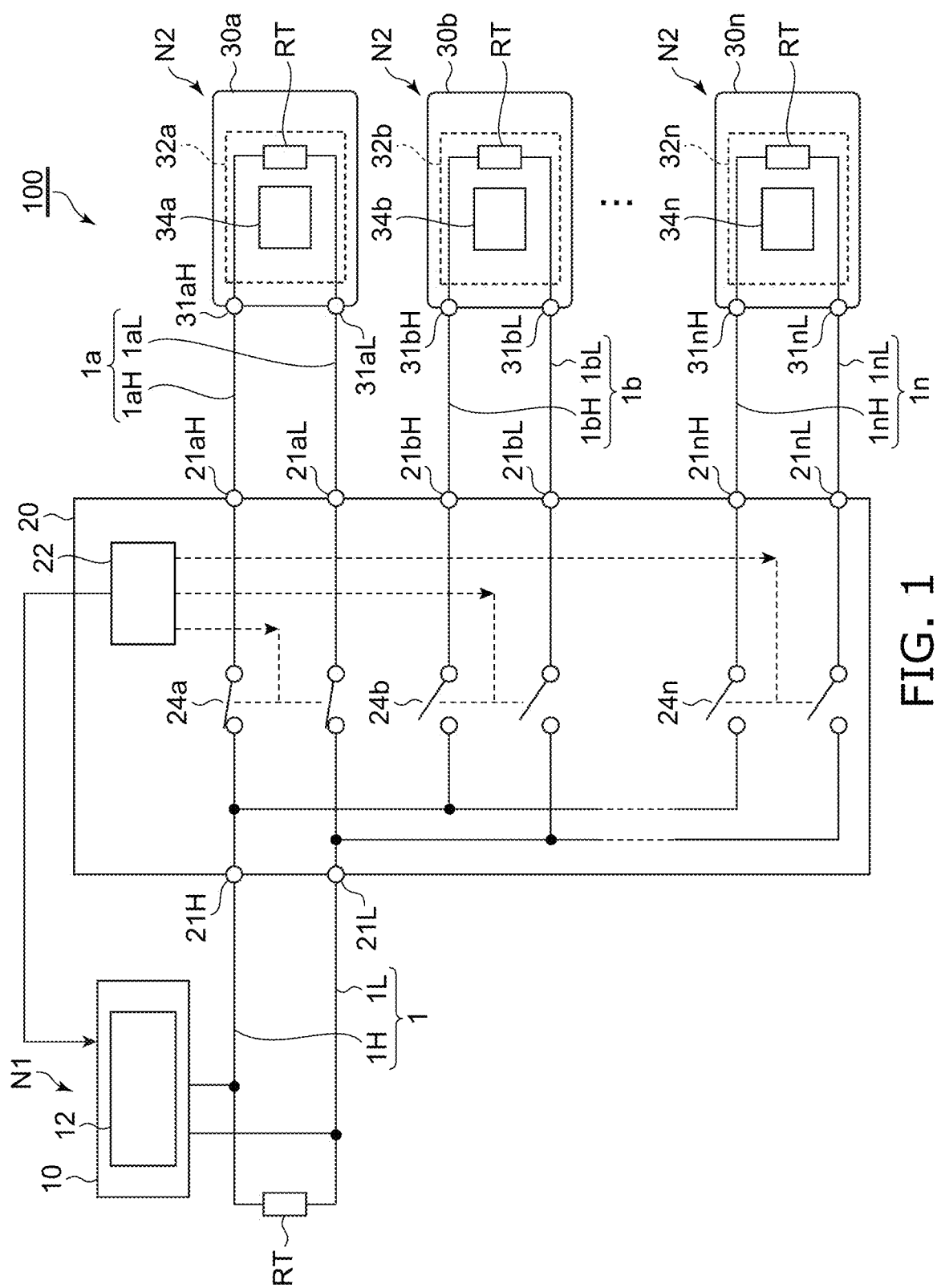
FIG. 1 is a schematic block diagram illustrating a CAN communication multi-connection system according to an embodiment.

Various embodiments are described below with reference to the accompanying drawings.

The drawings are schematic or conceptual; and the relationships between the thickness and width of portions, the proportions of sizes among portions, etc., are not necessarily the same as the actual values. Also, the dimensions and proportions may be illustrated differently among drawings, even when the same portion is illustrated.

In the specification and drawings, components similar to those described previously or illustrated in an antecedent drawing are marked with the same reference numerals; and a detailed description is omitted as appropriate.

FIG. 1 is a schematic block diagram illustrating a CAN communication multi-connection system according to an embodiment.

As shown in FIG. 1, the CAN communication multi-connection system (the bus connection system) 100 of the embodiment includes a control device 10 and a multi-connection device (a bus connection device) 20. The control device 10 and the multi-connection device 20 are connected to a bus 1 (a first bus). Multiple battery packs 30a to 30n are provided to be connectable to the bus 1.

The control device 10 includes a control circuit 12. The control circuit 12 includes a CAN controller and transmits and receives data according to the CAN (Controller Area Network) protocol. The control circuit 12 is connected to one end of the bus 1 that follows the CAN protocol. A terminating resistance RT is connected to the one end of the bus 1; and the control device 10 that includes the control circuit 12 operates as a first node N1 following the CAN protocol. The control device 10 may include a control circuit that performs charge and discharge control of the battery packs 30a to 30n. The control circuit for the charge and discharge control can control the charge and the discharge of the battery packs based on data received according to the CAN protocol.

The bus 1 includes a twisted pair cable made of one set of a high wire 1H and a low wire 1L and transmits a differential signal according to the CAN protocol.

The multi-connection device 20 includes a pair of terminals 21H and 21L, a pair of terminals 21aH and 21aL, a pair of terminals 21bH and 21bL, . . . , and a pair of terminals 21nH and 21nL. The multi-connection device 20 is connected to another end of the bus 1 via the pair of terminals 21H and 21L. One end of a bus 1a is connected to the pair of terminals 21aH and 21aL. The bus 1a includes a twisted pair cable made of one set of a high wire 1aH and a low wire 1aL. The pair of terminals 21bH and 21bL is connected to one end of a bus 1b. The bus 1b includes a twisted pair cable made of one set of a high wire 1bH and a low wire 1bL. Similarly, one end of a bus 1n is connected to the pair of terminals 21nH and 21nL as well, and the bus 1n includes a twisted pair cable made of one set of a high wire 1nH and a low wire 1nL.

That is, the other end of the bus 1 is connected to the multi-connection device 20; and one end of each of the n sets of the buses 1a, 1b, . . . , 1n is connected to the multi-connection device 20.

The first battery pack (the first battery pack) 30a includes a pair of terminals 31aH and 31aL and is connected to another end of the first bus 1a via the pair of terminals 31aH and 31aL. The battery pack 30a includes a control board 32a that includes a control circuit 34a connected to the bus 1a; and the terminating resistance RT is located on, for example, the control board 32a and terminates the bus 1a. The control circuit 34a includes a CAN controller; and the control circuit 34a can communicate according to the CAN protocol. The control circuit 34a can communicate with the other nodes according to the CAN protocol to transmit and receive data including the battery terminal voltage, charge and discharge current, etc., detected in the battery pack 30a.

The second battery pack (the second battery pack) 30b includes a pair of terminals 31bH and 31bL and is connected to another end of the second bus 1b via the pair of terminals 31bH and 31bL. The battery pack 30b includes a control board 32b that includes a control circuit 34b connected to the bus 1b; and the terminating resistance RT is located on, for example, the control board 32b and terminates the bus 1b. The control circuit 34b includes a CAN controller; and the control circuit 34b can communicate according to the CAN protocol. The control circuit 34b can communicate with the other nodes according to the CAN protocol to transmit and receive data including the battery terminal voltage, charge and discharge current, etc., detected in the battery pack 30b.

Similarly to the other battery packs 30a, 30b, . . . , the nth battery pack 30a includes a pair of terminals 31nH and 31nL and is connected to another end of the nth bus 1n via the pair of terminals 31nH and 31nL. The battery pack 30n includes a control board 32n that includes a control circuit 34n connected to the bus 1n; and the terminating resistance RT is located on, for example, the control board 32n and terminates the bus 1n. The control circuit 34n includes a CAN controller; and the control circuit 34n can communicate according to the CAN protocol. The control circuit 34n can communicate with the other nodes according to the CAN protocol to transmit and receive data including the battery terminal voltage, charge and discharge current, etc., detected in the battery pack 30n.

The n battery packs 30a, 30b, . . . , 30n each have the same configuration and operate as a second node N2 that follows the CAN protocol. In the following description, different reference numerals are used as in the battery packs 30a to 30n for differentiation in the description of the operation of the CAN communication multi-connection system 100.

The configuration of the multi-connection device 20 will now be described in detail.

The multi-connection device 20 includes a contact switching circuit 22 and n switches 24a to 24n. The contact switching circuit 22 is connected to the n switches 24a to 24n; and the n switches 24a to 24n are opened and closed by switch signals output by the contact switching circuit 22. The contact switching circuit 22 also is connected to the control device 10 and transmits information related to the opening and closing of the switches 24a to 24n to the control device 10.

The switch (a first switch) 24a is located between the terminals 21H and 21L and the terminals 21aH and 21aL. The switch (a second switch) 24b is located between the terminals 21H and 21L and the terminals 21bH and 21bL. Similarly, the nth switch 24n is located between the terminals 21H and 21L and the terminals 21nH and 21nL.

The contact switching circuit 22 outputs switch signals to close one switch among the n switches 24a to 24n and to open the other switches. The contact switching circuit 22 outputs switch signals to sequentially close the n switches 24a to 24n by sequentially modifying the switch that is closed. For example, the contact switching circuit 22 outputs switch signals to close the switches 24b to 24n after outputting a switch signal to close the first switch 24a. Continuing, the contact switching circuit 22 outputs switch signals to close the second switch 24b and open the switches other than the switch 24b. The opening and closing of the switches are similarly switched sequentially; and the contact switching circuit 22 outputs switch signals to close the nth switch 24n and open the switches other than the switch 24n. The contact switching circuit 22 repeats the operation described above.

By such an operation of the contact switching circuit 22, the bus 1 is sequentially switched and connected to the buses 1a to 1n. By the contact switching circuit 22 operating as described above, the bus 1 and the bus 1a can be treated as one set of buses following the CAN protocol; and the bus 1 and the bus 1b also can be treated as one set of buses following the CAN protocol. Similarly, the bus 1 and the bus 1n also can be treated as one set of buses following the CAN protocol.

The contact switching circuit 22 also is connected to the control device 10. The contact switching circuit 22 transmits a synchronization signal due to the opening and closing of the switches 24a to 24n and information of which switch is closed to the control device 10. Based on the information received from the contact switching circuit 22, the control device 10 can determine which of the buses 1a to 1n is the bus of the data currently represented on the bus 1.

In the contact switching circuit 22, the switching period, the timing of opening and closing the switches 24a to 24n, the periods in which the switches 24a to 24n are closed, etc., may be set by a program stored in a not-illustrated memory circuit, a memory device, etc. The contact switching circuit 22 may include an arithmetic processor such as a CPU (Central Processing Unit) or the like and may use the CPU or the like to realize the functions described above by executing the program described above.

The order of the switches closed by the contact switching circuit 22 is not limited to the order described above, and is arbitrary as long as there are periods in which the switches 24a to 24n each are closed. Also, the period in which the switch is closed may not overlap between the multiple switches; and a period may exist in which all of the switches 24a to 24n are open. Also, it is sufficient for the periods in which the switches 24a to 24n are closed to be appropriately set according to a communication speed according to the CAN protocol; and the periods may be different periods or the same period between the switches 24a to 24n. In the following description, the contact switching circuit 22 outputs switch signals that close the switches 24a, 24b, . . . , 24n in this order; and the switching period is constant according to the data transmission rate.

The operation of the CAN communication multi-connection system 100 of the embodiment will now be described.

In the CAN communication multi-connection system 100 of the embodiment, the control device 10 identifies the battery packs 30a to 30n that have the same ID and receives the desired data from the battery packs 30a to 30n.

In the CAN communication multi-connection system 100 of the embodiment, two types of operation modes are set for the control device 10 to receive and identify the battery pack data. In a first operation mode, the control device 10 receives data respectively from all of the battery packs 30a to 30n without designating a specific battery pack. In a second operation mode, the control device 10 receives data from a battery pack designated by the control device 10. In the second operation mode, a function equivalent to the first operation mode also can be realized by the control device 10 sequentially designating the battery packs.

Figure 2:
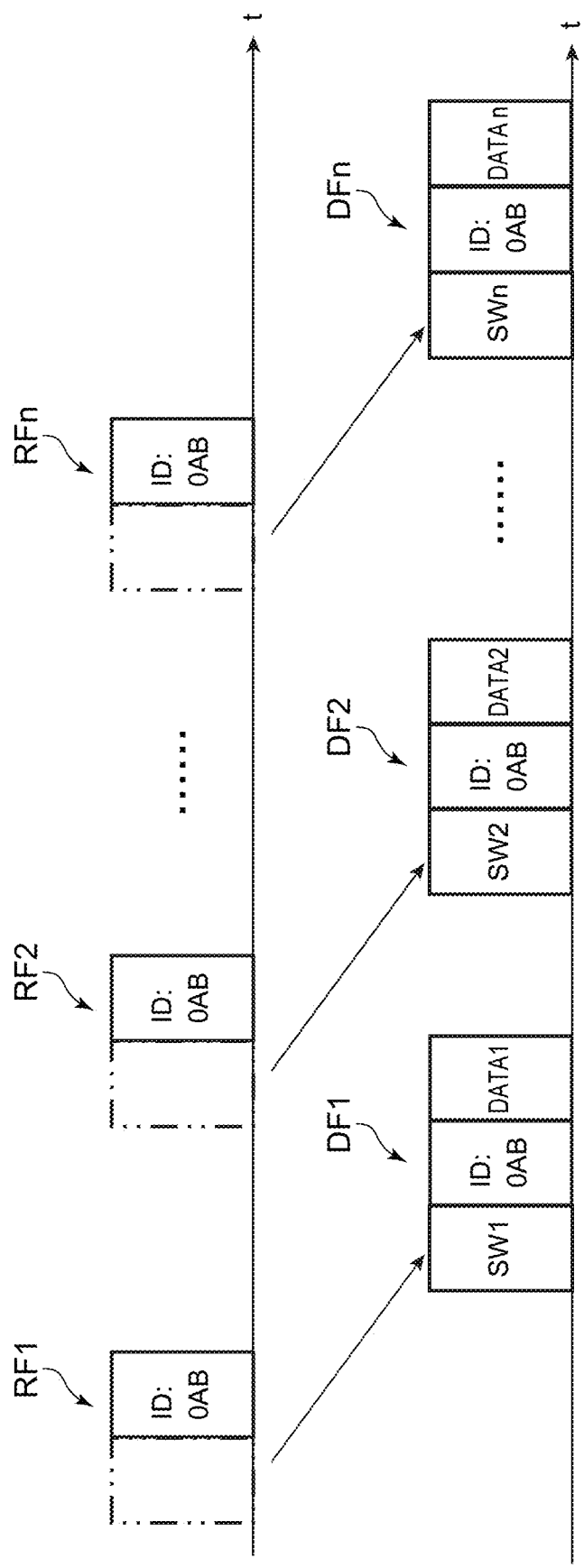
FIG. 2 is an example of a schematic timing chart for describing the operation of the CAN communication multi-connection system of the embodiment.

FIG. 2 is an example of a schematic timing chart for describing the operation of the CAN communication multi-connection system of the embodiment.

The operation of the CAN communication multi-connection system 100 in the first operation mode will now be described using FIG. 2.

The upper diagram of FIG. 2 schematically illustrates remote frames RF1 to RFn output by the control device 10 to the bus 1. In the example, the control device 10 outputs the n remote frames RF1 to RFn as one set. Although one set is illustrated in FIG. 2, in the operation of the first mode, the set of the n remote frames is continuously output to the bus 1 while the operation is continued.

The lower diagram of FIG. 2 schematically illustrates the identified data frames DF1 to DFn received by the control device 10.

The diagonal arrows of FIG. 2 show that the identifiable data frames DF1 to DFn are formed by attaching identification data to the same remote frame.

As shown in FIG. 2, the control device 10 sequentially outputs the n remote frames RF1 to RFn to the bus 1. The remote frames RF1 to RFn that are output by the control device 10 have the same ID: 0AB as the destination ID. In the example, ID: 0AB is identification data identifying the second node N2. That is, other than the remote frames RF1 to RFn having different output timing from the control device 10, the remote frames RF1 to RFn are the same frame and are indistinguishable.

For convenience of description hereinbelow, the remote frames RF1 to RFn are illustrated in order of output to the bus 1. Also, the remote frame RF1 is output to the bus 1 in the period in which the first switch 24a is closed; the remote frame RF2 is output to the bus 1 in the period in which the second switch 24b is closed; similarly, the remote frame RFn is output to the bus 1 in the period in which the nth switch 24n is closed. It goes without saying that the CAN communication multi-connection system 100 of the embodiment is not limited to the description described above as long as the closed switch and the battery pack connected by the switch can be designated.

In the first operation mode, the control device 10 outputs the remote frame to the bus 1 while one of the switches is closed and receives the data frame from the battery pack connected to one of the buses among the n sets connected to the closed switch. Identification data that identifies the closed switch is attached to the data frame received by the control device 10; and the control device 10 can identify which battery pack output the received data.

Specifically, the control device 10 outputs the remote frame RF1 to the bus 1 in the period in which the first switch 24a is closed (the first period). The first battery pack 30a is connected to the bus 1a connected to the switch 24a; and the control circuit 34a of the battery pack 30a recognizes by the remote frame RF1 that the control device 10 is requesting data.

The control circuit 34a forms a data frame based on the received remote frame RF1 and data DATA1 of the battery pack 30a and outputs the data frame to the bus 1a.

The multi-connection device 20 forms a first data frame DF1 by attaching identification data (first identification data) SW1 representing the switch 24a to the data frame output to the bus 1a and outputs the formed data frame DF1 to the bus 1.

The control device 10 receives the data frame DF1 on the bus 1. The control device 10 can determine that the acquired data DATA1 is the data of the first battery pack 30a because the identification data SW1 corresponding to the first switch 24a is attached to the data frame DF1.

When the second switch 24b is closed, the control device 10 outputs the remote frame RF2 on the bus 1 within the period in which the switch 24b is closed (the second period). The second battery pack 30b is connected to the bus 1b connected to the switch 24b; and the control circuit 34b of the battery pack 30b recognizes by the remote frame RF2 that the control device 10 is requesting data.

Based on the received remote frame RF2 and data DATA2 of the battery pack 30b, the control circuit 34b forms a data frame and outputs the formed data frame to the bus 1b.

The multi-connection device 20 forms a data frame DF2 by attaching identification data (second identification data) SW2 corresponding to the switch 24b to the data frame output to the bus 1b and outputs the formed data frame DF2 to the bus 1.

The control device 10 receives the data frame DF2 on the bus 1 and determines that the acquired data DATA2 is the data of the second battery pack 30b by the identification data SW2.

Similarly thereafter, the control device 10 can acquire the data of the battery packs 30a to 30n. The control device 10 can use the identification data representing the switches 24a to 24n attached to the received data frames DF1 to DFn to determine from which of the battery packs 30a to 30n the data was output.

The multi-connection device 20 is not limited to attaching the identification data of the switch to the output data frame after the battery packs 30a to 30n output the data frame. As in the double dot-dash line of FIG. 2, the multi-connection device 20 may attach the identification data of the switch to the remote frame that is output by the control device 10 to the bus 1 and transmitted to the battery packs 30a to 30n.

A series of procedures of the first operation mode will now be described using a flowchart.

Figure 3:
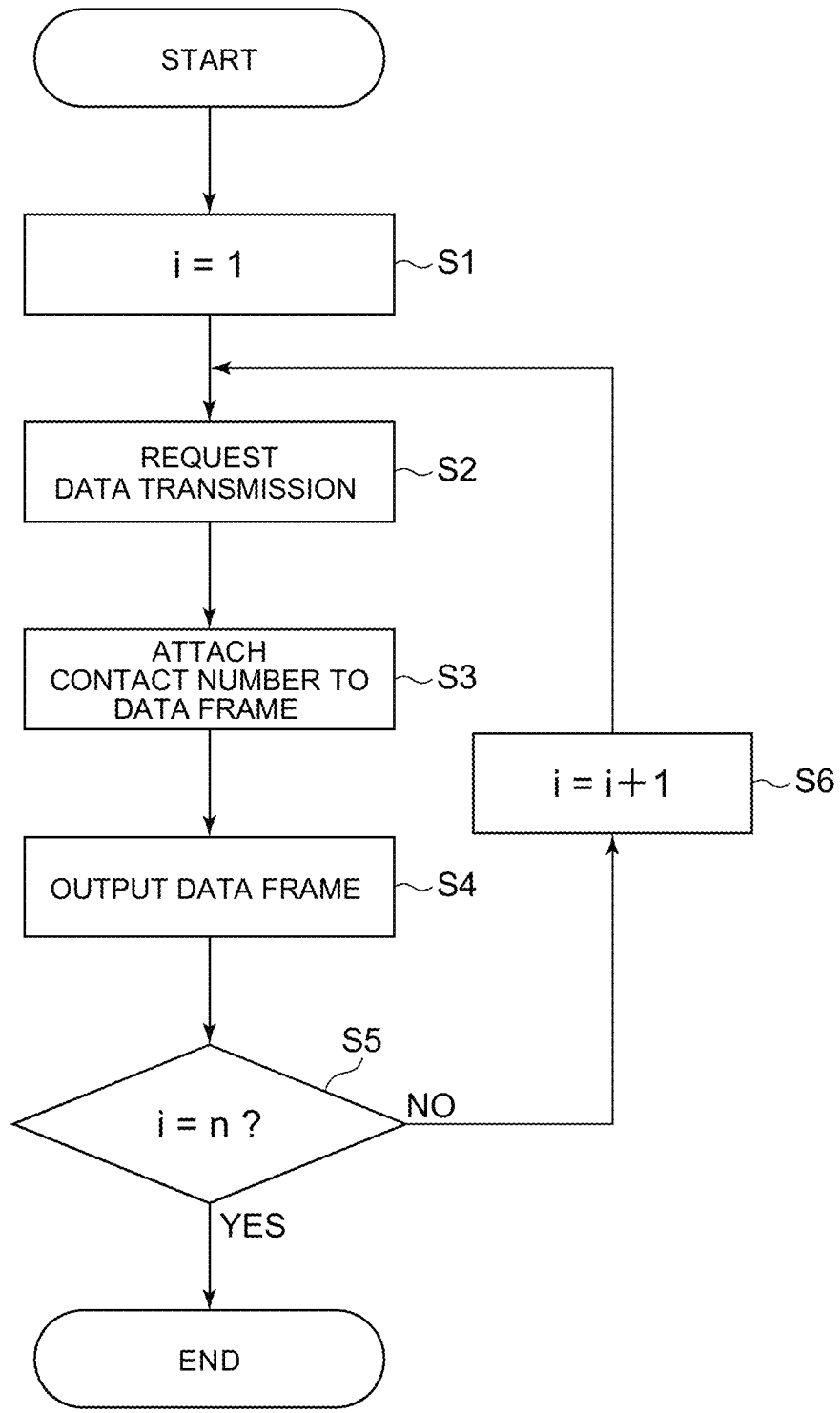
FIG. 3 is an example of a flowchart for describing the operation of the CAN communication multi-connection system of the embodiment.

FIG. 3 is an example of a flowchart for describing the operation of the CAN communication multi-connection system of the embodiment.

In the example, the switches 24a to 24n, the buses 1a to 1n, and the battery packs 30a to 30n are identified by using identification numbers as the identification data of the switches 24a to 24n and by using 1 to n as the identification numbers.

In step S1 as shown in FIG. 3, the multi-connection device 20 sets the identification number i of the switch of the closed circuit to 1. The multi-connection device 20 closes the switch 24a of the identification number 1.

In step S2, the control device 10 outputs the remote frame RF1 to the bus 1 to request the transmission of the data when the switch 24a is closed. The control circuit 34a of the battery pack 30a forms a data frame based on the remote frame RF1 and its own data DATA1 and outputs the data frame to the bus 1a.

In step S3, the multi-connection device 20 forms the data frame DF1 by attaching the identification data SW1 of the switch 24a to the data frame on the bus 1a.

In step S4, the multi-connection device 20 outputs the formed data frame DF1 to the bus 1. The control device 10 receives the data frame DF1 on the bus 1.

In step S5, the multi-connection device 20 determines whether or not the identification number of the switch is n. When the identification number of the switch is n, the processing ends.

When the identification number of the switch is not n, the processing transitions to step S6.

In step S6, the multi-connection device 20 sets a new identification number by adding 1 to the identification number i of the switch; the processing transitions to step S2; and the processing of step S2 and subsequent steps repeats as described above.

Thus, the control device 10 can acquire the data DATA1 to DATAn of the battery packs 30a to 30n from the n battery packs 30a to 30n.

The operation of the CAN communication multi-connection system 100 in the second operation mode will now be described using FIG. 4.

Figure 4:
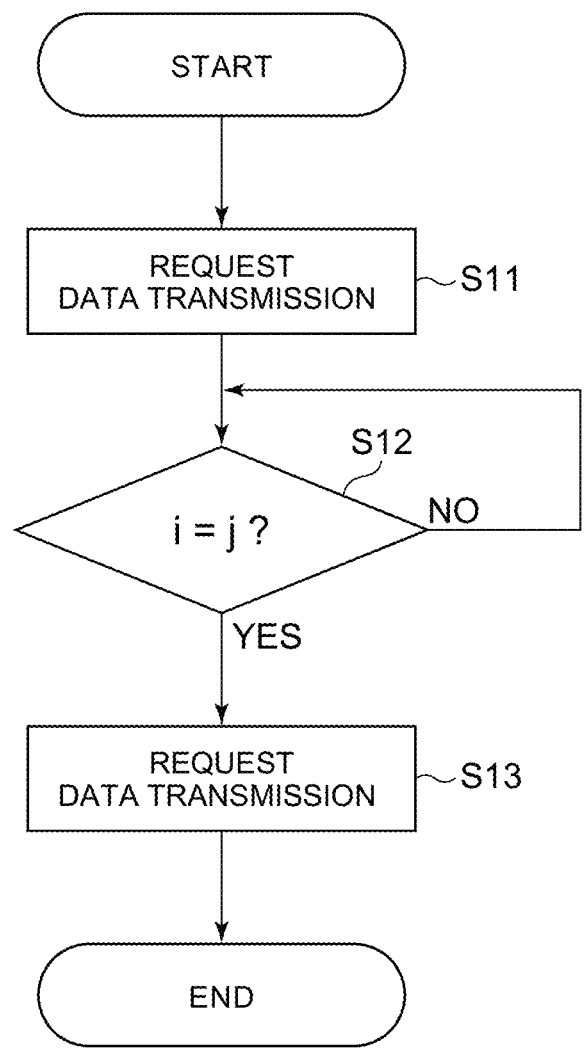
FIG. 4 is an example of a flowchart for describing the operation of the CAN communication multi-connection system of the embodiment.

FIG. 4 is an example of a flowchart for describing the operation of the CAN communication multi-connection system of the embodiment.

In step S11 as shown in FIG. 4, the control device 10 requests the transmission of data from the desired battery pack. The desired battery pack is, for example, the jth battery pack.

The multi-connection device 20 operates to sequentially switch the switches 24a to 24n regardless of the request-to-send of the control device 10. The multi-connection device 20 transmits the data of the identification number of the switch in which the circuit is closed to the control device 10. In the example, the multi-connection device 20 sequentially transmits the identification numbers 1 to n of the switches 24a to 24n to the control device 10.

In step S12, the control device 10 receives the identification number i and determines whether or not the identification number i is j. When the identification number i is j, the processing transitions to the next step S13. When the identification number i is not j, the processing goes to standby.

In step S13, the control device 10 requests the data transmission of the jth battery pack by outputting the remote frame to the bus 1. In the jth battery pack, a data frame is formed based on its own data and the remote frame received from the control circuit and outputs the formed data frame to the bus to which the jth battery pack is connected.

The multi-connection device 20 may attach the identification number j of the switch to the data frame output to the jth bus and output the data frame to the bus 1, or may attach the identification number of the switch to the data frame received by the control device 10.

Thus, the control device 10 can acquire the data of the desired battery pack.

Effects of the CAN communication multi-connection system 100 of the embodiment will now be described in comparison with a comparative example.

Figure 5:
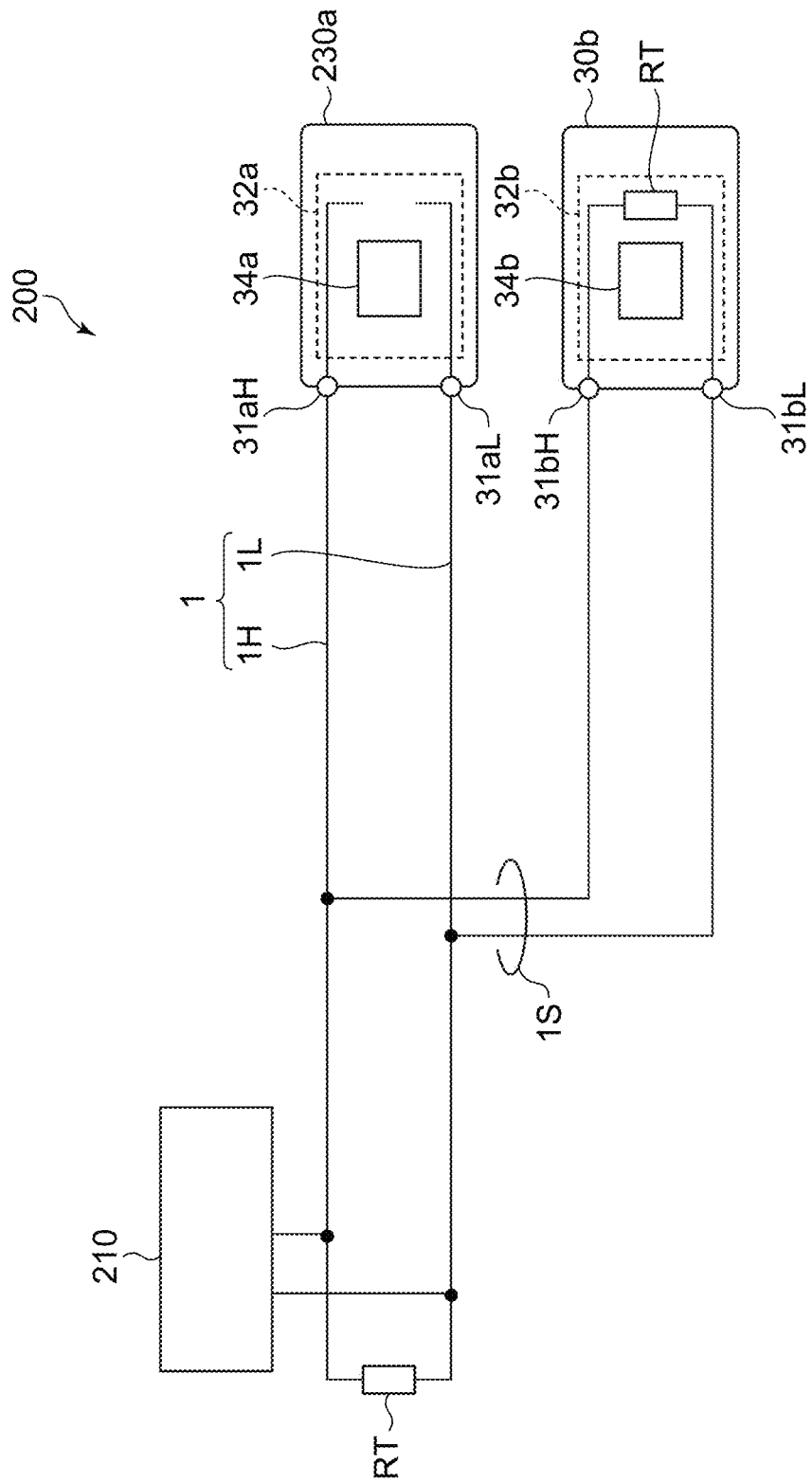
FIG. 5 is a schematic block diagram illustrating a CAN communication multi-connection system according to the comparative example.

FIG. 5 is a schematic block diagram illustrating a CAN communication multi-connection system according to the comparative example.

In the example shown in FIG. 5, the bus 1 that is made of the high wire 1H and the low wire 1L is branched and connects two battery packs 230a and 30b.

As shown in FIG. 5, the CAN communication system 200 includes the bus 1 following the CAN protocol and a branch bus 1S branched from the bus 1. A control device 210 is connected to one node of the bus 1. The bus 1 to which the control device 210 is connected is terminated with the terminating resistance RT.

The battery pack 230a is connected to another node of the bus 1. The branch bus 1S that is branched from the bus 1 is connected to the battery pack 30b at the end part. The battery pack 30b is, for example, the same as the battery pack according to the embodiment described above. On the other hand, in the battery pack 230a, the terminating resistance RT is detached by disassembling the battery pack 30a of the embodiment described above.

In the comparative example, the terminating resistance RT is detached from the battery pack 230a while the terminating resistance RT remains connected in the battery pack 30b to be able to differentiate the battery packs 230a and 30b as different nodes to meet the CAN communication hardware specifications. Many man-hours are necessary to detach the terminating resistance RT because it is necessary to disassemble the battery pack.

In the CAN protocol, a branch from a single bus is considered a stub; and the stub length is limited. The stub length is set according to the communication speed and must be reduced as the communication speed is increased. For example, when the communication speed is 500 kbps which is the CAN communication speed of an electric vehicle battery pack, it is necessary for the stub length to be not more than 0.3 (m).

Thus, in the comparative example, the control device 210 identifies the battery packs 230a and 30b by the existence or absence of the terminating resistance RT. It is therefore difficult to connect many battery packs to one bus.

Also, because it is necessary to disassemble and alter the battery pack to process the terminating resistance RT, it is necessary to disassemble and alter nearly all of the recovered battery packs; and many man-hours are necessary.

Furthermore, there are also cases where the shape of the battery pack is not less than 1 (m) per side. In such a case, due to the limit of the stub length (0.3 m) based on the communication speed of the electric vehicle battery pack, in almost every case, it is necessary to perform the branch inside the battery pack. Therefore, the battery pack must be disassembled and the connection for branching must be made inside the battery pack; and many man-hours are necessary.

In contrast, the CAN communication multi-connection system 100 of the embodiment includes the multi-connection device 20; and identification data that is set according to the switch can be attached by the multi-connection device 20 to the data frame output by the battery pack. Therefore, the control device 10 can identify the battery pack from which the received data frame was output. Therefore, many battery packs can be connected.

Also, in the CAN communication multi-connection system 100 of the embodiment, the multi-connection device 20 generates the identification data of the battery pack data; therefore, many battery packs that have the same ID can be connected and identified without altering the battery packs.

Furthermore, the multi-connection device 20 of the CAN communication multi-connection system 100 of the embodiment can select and connect one bus from multiple buses by switching between the number of switches 24a to 24n corresponding to the number of multiple buses. Therefore, the multiple buses 1a to 1n can be switched and connected without branching one bus 1; and many battery packs can be connected and located with a high degree of freedom without considering the stub length.

Figure 6:
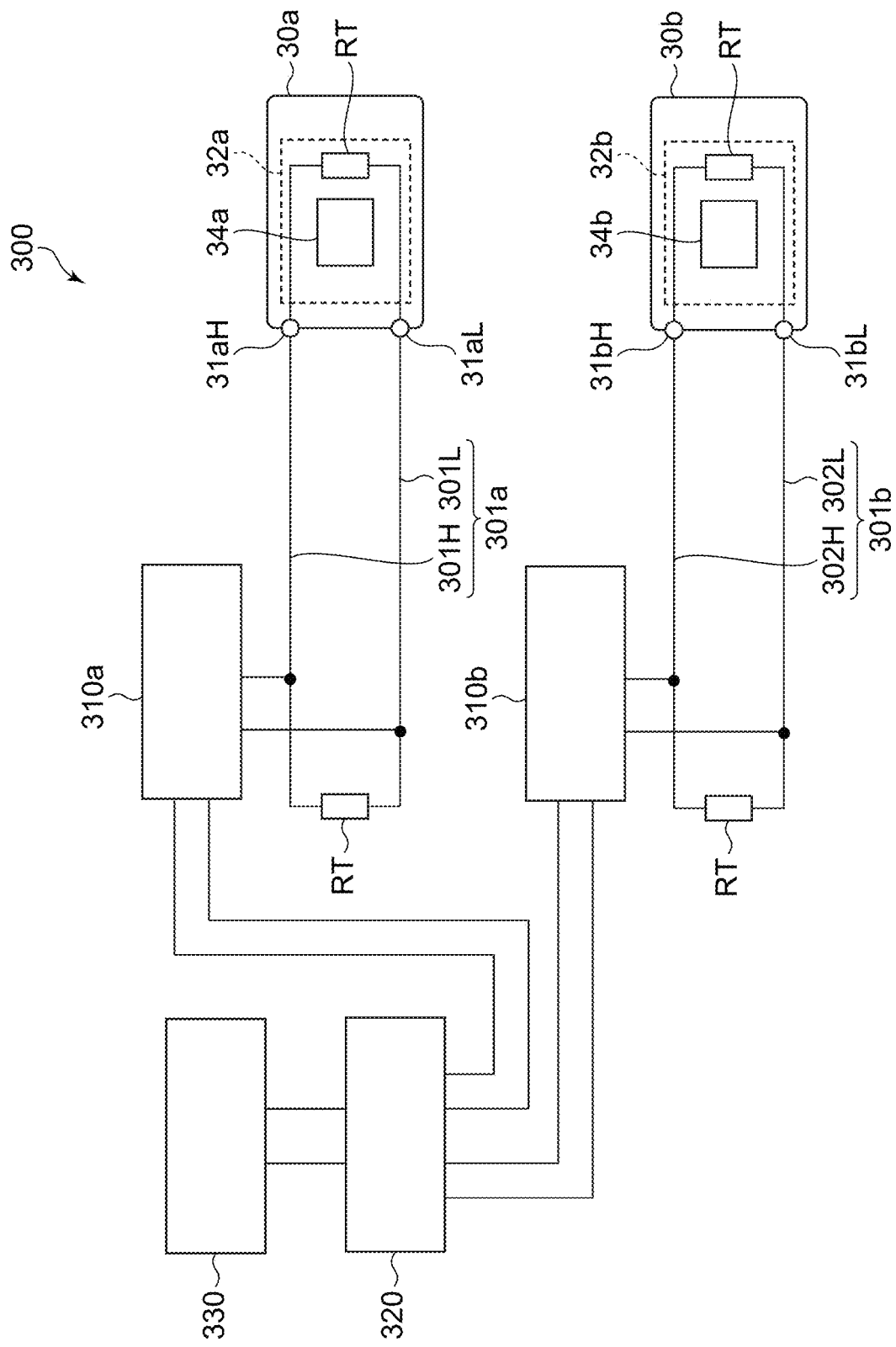
FIG. 6 is a schematic block diagram illustrating a CAN communication multi-connection system according to a comparative example.

FIG. 6 is a schematic block diagram illustrating a CAN communication multi-connection system according to a comparative example.

FIG. 6 shows a comparative example that identifies the multiple battery packs by a different method from that of FIG. 5.

As shown in FIG. 6, a CAN connection system 300 of the comparative example includes a number of buses 301a and 301b corresponding to the number of the battery packs 30a and 30b. That is, in the comparative example, a control circuit 310a that includes a CAN controller and the like is connected to one node of one bus 301a; and the battery pack 30a is connected to the other node of the one bus 301a. Also, a control circuit 310b that includes a CAN controller is connected to one node of another bus 301b; and the battery pack 30b is connected to the other node of the bus 301b. The battery packs 30a and 30b are, for example, the same as the battery packs according to the embodiment.

The control circuit 310a attaches data identifying the bus 301a to the data acquired from the battery pack 30a and transmits the data to an integrated interface device 320. The control circuit 310b attaches data identifying the bus 301b to the data acquired from the battery pack 30b and transmits the data to the integrated interface device 320. The integrated interface device 320 transmits the data frames to which the identification data of the buses 301a and 301b is attached to a control device 330.

Although a case where two battery packs 30a and 30b are connected is described in the example of FIG. 6, when connecting the n battery packs 30a to 30n, it is necessary to provide n sets of buses and control circuits. According to the comparative example, many battery packs can be identified and the battery pack data can be acquired at the control device 330 side without altering the battery packs. However, it is necessary to provide as many sets of buses and control circuits as batteries; furthermore, the integrated interface device 320 for identifying the buses also is necessary. Accordingly, there is a risk that the scale of the circuitry may become large, and the cost may increase according to the number of battery packs.

In contrast, the CAN communication multi-connection system 100 of the embodiment includes the multi-connection device 20 between the bus 1 and the multiple battery packs 30a to 30n. Therefore, the control device 10 can acquire the data of the battery packs 30a to 30n by using the multi-connection device 20. Accordingly, the buses that connect the multiple battery packs 30a to 30n can be provided in a compact configuration without providing as many buses and control circuits as battery packs 30a to 30n.

Multiple operation modes are included in the CAN communication multi-connection system 100 of the embodiment; and the control device 10 can acquire the necessary identified data according to the operation mode. In the first operation mode, the multi-connection device 20 switches the switches 24a to 24n as in a self-excited oscillation operation and makes it possible to identify the data by attaching identification data representing the switches 24a to 24n; therefore, at the control device 10 side, it is sufficient to output a remote frame to the bus according to a switching timing signal transmitted from the multi-connection device 20; and the load of the operation can be reduced.

In the second operation mode, the control device 10 outputs the remote frame to the bus when the desired identification data is received from the multi-connection device 20; therefore, the necessary data can be acquired at the necessary timing. This can be used when supplementing when data of the first operation mode is missing, when disconnecting a specific battery when an abnormality such as degradation of a battery or the like is detected, etc.

The setting of the first and second operation modes can be switched at the control device 10 side; therefore, highly versatile power storage equipment operation is possible.

Because power storage equipment can be constructed using battery packs of the same specification, it is easy to manage the battery packs, replace when failure occurs, etc.

Thus, a CAN communication multi-connection system that can identify multiple battery packs is realized without altering the battery packs.

While certain embodiments have been described, these embodiments have been presented by way of example only, and are not intended to limit the scope of the inventions. The novel embodiments described herein may be embodied in a variety of other forms; furthermore, various omissions, substitutions, and changes in the form of the embodiments described herein may be made without departing from the spirit of the inventions. Such embodiments and their modifications also are within the scope and spirit of the inventions, and are within the scope of the inventions described in the claims and their equivalents.

REFERENCE NUMERAL LIST 1, 1a-1n bus
10 control device
12 control circuit
20 multi-connection device
22 contact switching circuit 24a-24n switch
30a-30n battery pack
32a-32n control board
100 CAN communication multi-connection system

The invention claimed is:

1. A bus connection system, comprising:
a control device connected to one end of a first bus, the control device operating as a first node; and
a bus connection device located between a first battery pack and an other end of the first bus and between a second battery pack and the other end of the first bus, the first battery pack operating as a second node, the second battery pack operating as the second node,
the bus connection device including
a first switch located between the first battery pack and the other end of the first bus,
a second switch located between the second battery pack and the other end of the first bus, and
a contact switching circuit sequentially opening and closing the first switch and the second switch,
the contact switching circuit
opening the second switch and generating first identification data in a first period in which the first switch is closed, the first identification data indicating that the first switch is closed, and
opening the first switch and generating second identification data in a second period in which the second switch is closed, the second identification data indicating that the second switch is closed,
the control device
acquiring the first identification data in the first period by communicating with a first control circuit of the first battery pack, and
acquiring the second identification data in the second period by communicating with a second control circuit of the second battery back.

2. The bus connection device according to claim 1, wherein the bus connection device:
attaches the first identification data to first data formed by the first control circuit; and
attaches the second identification data to second data formed by the second control circuit, and
the control device:
receives the first data to which the first identification data is attached in the communicating with the first control circuit; and
receives the second data to which the second identification data is attached in the communicating with the second control circuit.

3. The bus connection device according to claim 1, wherein the bus connection device:
notifies the control device in the first period that the first identification data is generated; and
notifies the control device in the second period that the second identification data is generated, and
the control device starts the communicating with the first control circuit or the second control circuit based on the notification.

4. The bus connection device according to claim 3, wherein the bus connection device:
attaches the first identification data to first data formed by the first control circuit; and
attaches the second identification data to second data formed by the second control circuit, and
the control device:
receives the first data to which the first identification data is attached in the communicating with the first control circuit; and
receives the second data to which the second identification data is attached in the communicating with the second control circuit.

* * * * *